United States Patent [19]
Craik

[11] 3,757,413
[45] Sept. 11, 1973

[54] METHOD OF MANUFACTURING SEALING RINGS

[75] Inventor: Darrel W. Craik, Escondido, Calif.

[73] Assignee: Teledyne, Inc., Los Angeles, Calif.

[22] Filed: Apr. 7, 1972

[21] Appl. No.: 241,977

[52] U.S. Cl.............. 29/557, 29/156.6, 29/159.1, 29/159 R, 72/105, 113/116 R
[51] Int. Cl............................................. B23p 13/04
[58] Field of Search............. 29/557, 156.6, 159.1, 29/159 R; 72/105, 106; 113/116 R

[56] References Cited
UNITED STATES PATENTS

| | | | |
|---|---|---|---|
| 2,227,746 | 1/1941 | Clark | 72/106 |
| 2,697,865 | 12/1954 | Norton | 29/156.6 X |
| 3,364,550 | 1/1968 | Jessee et al. | 29/159.1 |
| 3,381,353 | 5/1968 | Lemmerz | 29/159.1 |
| 3,586,544 | 6/1971 | Geffroy | 29/156.6 X |

Primary Examiner—Richard J. Herbst
Assistant Examiner—V. A. DiPalma
Attorney—Ronald W. Reagin et al.

[57] ABSTRACT

A method of manufacturing sealing rings or the like is disclosed in which the U-shaped cross-section is formed by two successive cold rolling steps. Thinning of the rings at the points of curvature is eliminated by forcing metal to cold flow from the flanges downward into the curved portion of the sealing ring.

5 Claims, 6 Drawing Figures

METHOD OF MANUFACTURING SEALING RINGS

This invention relates to sealing rings or the like, and more particularly to an improved method for manufacturing such rings in which the desired cross-section of the ring is formed by cold-rolling techniques.

It is a common practice to provide a sealing ring at the joint of two pipes or conducts which has a generally U-shaped, inwardly opening cross-section. Such sealing rings are frequently used to seal the joints between pipes which are carrying hot gases under pressure. By their nature, these sealing rings must be formed to very precise dimensions and with very small tolerances. Because of these severe dimensional requirements, the usual way for manufacturing such sealing rings in the prior art has been to machine them on a lathe from the desired material into the desired shape and configuration.

In addition to the obvious economic disadvantages from forming the sealing rings in this manner, there is also a significant performance disadvantage. Such sealing rings must, by their nature, have good resilience and elasticity. It is well known that these characteristics are very much a function of the grain orientation of the metal which forms the sealing ring. If the ring is machined from a single piece of metal which has a constant grain structure and orientation, it is obvious that, at different points around the circumference of the ring, the grain structure is significantly different relative to the cross-sectional area of the ring at that point on the circumference.

Those skilled in the art have long recognized that the above mentioned economic and performance factors could both be significantly improved if the sealing rings could be manufactured by suitable cold rolling technique. Such techniques are inherently much cheaper than machining and also result in a ring which has a constant grain orientation relative to the cross-section of the ring all around the circumference of the ring.

However, all prior attempts to form such sealing rings by cold-rolling techniques have been unsuccessful. These prior art attempts have usually failed because the sealing rings could not be formed to the necessary close tolerances and because the conventional cold-rolling techniques inherently resulted in a thinning of the metal at the points of curvature of the metal. Such thinning is particularly unacceptable in sealing rings of this type because it results in a mechanical weakness of the ring at the point where maximum strength and resilience of the ring is required. Thus, it has been widely believed in the prior art that cold-rolling techniques could not be used to manufacture such sealing rings.

In accordance with the present invention, it has been discovered that, if the proper steps are taken in the cold-rolling procedure, these techniques can be used to form satisfactory sealing rings of the type mentioned above which have the necessary accurate dimensions and close tolerances.

It is accordingly the object of the present invention to provide an improved method for manufacturing such sealing rings in which the cross-section of the sealing ring is formed by cold-rolling techniques.

Briefly stated, and in accordance with the present invention, a method of manufacturing a sealing ring or the like which has predetermined outside and inside diameters and a generally U-shaped inwardly opening cross-section having a predetermined internal radius of curvature and flanges of a predetermined flange length is provided in which the sealing ring is formed from a strip or sheet of metal having a desired initial thickness. In accordance with the method, a tubular band of metal is first formed from the strip whose diameter is between the above mentioned predetermined outside and inside diameters of the sealing ring to be formed. Next, this tubular band is cold-rolled in a first die into a intermediate ring until it has a generally U-shaped inwardly cross-section whose internal radius of curvature is greater than the predetermined internal radius of curvature which the final ring is to have and whose flanges are longer than the flanges which are to be formed on the final ring. This intermediate ring is then rolled in a second die until it has the desired predetermined internal radius of curvature. The second die is shaped to engage the inner surface, the outer surface and the ends of the flanges of the ring. Thus, during the second rolling operation, the die, by engaging the ends of the flanges of the ring, forces the metal to cold flow from the flanges down into the curved portion of the cross-section to provide the desired constant thickness of the ring at this point and to prevent thinning of the metals at the curved portion of the ring.

For a complete understanding of the invention, and an appreciation of its other objects and advantages, please refer to the following detailed description of the attached drawings, in which:

FIG. 1 is a plan view of a sealing ring which can conveniently be manufactured by the method of the present invention and FIG. 2 is a cross-sectional view of the sealing ring taken along the line 2—2 in FIG. 1. For convenience, the following description is of FIGS. 1 and 2 simultaneously.

Figure 1:
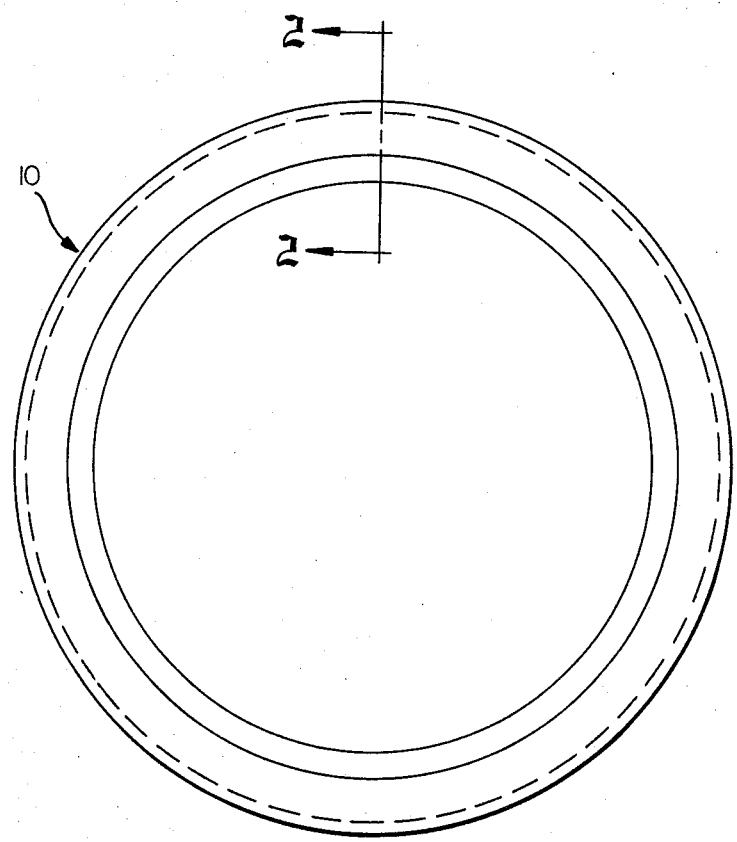
FIG. 1 is a plan view of the sealing ring which can be manufactured in accordance with the method of present inventions.

The sealing ring 10 is a circular ring which has a generally U-shaped inwardly opening cross-section which includes a curved outer portion 12 and two flanges 14 and 16. Each of the flanges 14 and 16 terminates with an end surface 18 and 20 respectfully. In a typical sealing ring 10, the thickness of the flanges 14 and 16 gradually decreases in the direction away from the curved section 12 of the ring 10. This is done to provide the desired resilient properties in the flanges 14 and 16. Also, in most such sealing rings 10, land portions 22 and 24 are provided near the ends of flanges 14 and 16 respectively.

While the present invention is not limited to forming sealing rings having any particular size or dimensions, the details of the following description of the method of the invention show the manner in which a sealing ring 10 having the following dimensions can be formed: The outside diameter of the ring 10 is 3.800 inches. The inside diameter of the ring 10 is 3.400 inches. The thickness of the walls of the sealing ring in the curved section 12 is 0.040 inches. The length of the flanges 14 and 16 is such that the dimension L is 0.200 inches. The internal radius of curvature R of the generally U-shaped cross-section is 0.025 inches. These dimensions are given merely to assist in the description of the invention in the manufacture of a typical sealing ring 10. Those skilled in the art will readily appreciate how to use the method of the invention to form sealing rings having other desired dimensions.

Figure 2:
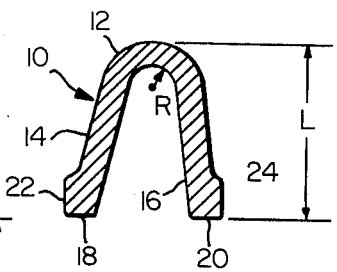
FIG. 2 is a sectional view taken along the lines 2—2 of FIG. 1.
Figure 3:
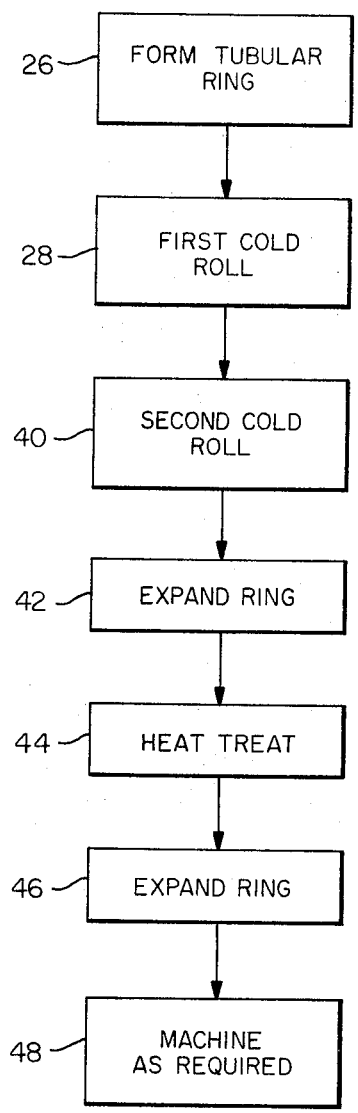
FIG. 3 is a block flow diagram of the method in accordance with the present invention by which the sealing ring of FIGS. 1 and 2 can be manufactured.

FIG. 3 shows a block flow diagram of the steps of the present invention by which the sealing ring 10 shown in FIGS. 1 and 2 can easily and economically be formed to precise dimensions. As is shown in FIG. 3, the first step 26 is to form a tubular ring of the proper thickness and width and whose diameter is between the inside and outside diameter of the ring 10 to be formed. Preferably this is formed from a sheet metal blank or strip formed from the desired material of proper thickness, width and length. To form the ring having the dimensions described above, such a strip of nickel base alloy is formed which has a thickness of 0.040 inches, a width of 0.450 inches and a length of 10.985 inches. The strip is then coiled into a tubular ring, and the ends of the tubular ring are held in a suitable clamping device and welded together. Thereafter, the weld is properly dressed as desired. The manner of forming such a tubular ring is well known to those skilled in the art, so no further details are given herein.

Alternatively, instead of forming one tubular ring at a time in the manner described above, an entire sheet of metal could be formed into a long tube, and tubular rings of the proper width could be sliced from the long tube in any desired manner.

Figure 4:
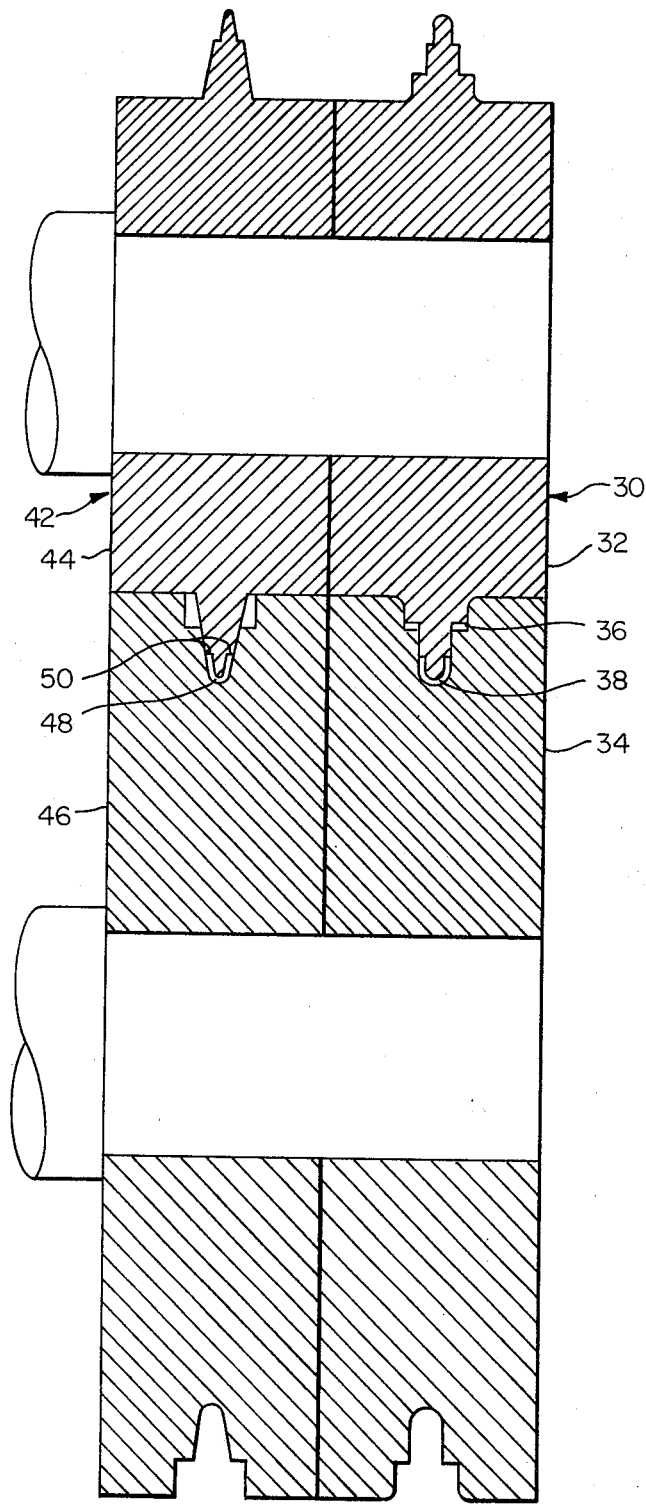
FIG. 4 is a cross-sectional view of the first and second rolling dies used with the present invention.

The next step 28 in the method is to pass the tubular ring as formed in the step 26 through a first cold-rolling die. FIG. 4 shows a cross-sectional view of two such cold-rolling dies, one of which is a first cold rolling die 30 which includes a male rolling member 32 and a female rolling member 34.

As is shown in FIG. 4, the elements of the first rolling die 30 are formed such that, when the male member 32 is withdrawn from the female member 34, a shelf 36 exists in the female member 34 which receives the tubular ring formed in the step 26 above. When the ring is placed on the shelf 36 and the two portions of the first rolling die 30 are brought together in a rolling relation, the dimensions of the male member 32 and the female member 34 are such that the tubular ring is cold-rolled into the space 38 which has a generally U-shaped, inwardly opening cross-section.

Figure 5:
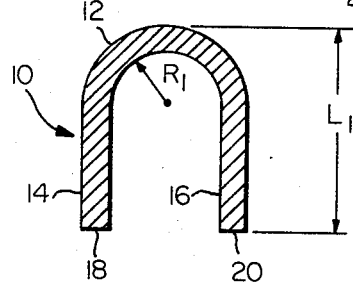
FIG. 5 is a cross-sectional view of the sealing ring after it has passed through the first die of FIG. 4.

FIG. 5 shows the cross-section of the ring 10 after it has been passed through the first rolling die 30. As is shown in FIG. 5, the cross-section is now a generally inwardly opening U-shaped cross-section which has an internal radius of curvature $R_1$ and which has flanges which have a length such that the total height of the cross-section is the dimension $L_1$. In accordance with one of the features of the present invention, these dimensions are formed in the first die 30 such that the radius of the curvature $R_1$ is substantially greater than the radius of curvature R of FIG. 2 and the dimension $L_1$ is somewhat longer than the dimension L of FIG. 2. To form a sealing ring 10 having the dimensions described above, the dimension of the die 30 might be chosen such that the radius of curvature $R_1$ is 0.050 inches and the dimension $L_1$ is 0.220 inches.

At this point, it is noted that after the tubular ring formed in step 26 is cold-rolled in step 28, the thickness of the walls of the intermediate ring shown in FIG. 5 are no longer constantly the same as was the thickness of the tubular ring prior to the cold rolling. Because the tubular ring has now been rolled into a curved cross-section, portions of the wall have been thinned to allow for this curvature. It is this thinning because of curvature which has led the prior art to believe that suitable sealing rings 10 could not be formed by the cold rolling method. However, no account of this thinning is taken at this first cold rolling step 28 of the method, since it will be compensated for in the second cold-rolling step 40 described below.

Returning now to the description of the block flow diagram of FIG. 3, after the intermediate ring shown in FIG. 5 is formed in the step 28, the intermediate ring is subjected to a second cold rolling step 40. This second cold rolling step 40 is performed in the second cold rolling die 42, which is also shown in FIG. 4.

As is shown in FIG. 4, this second rolling die 42 includes a male rolling member 44 and a female rolling member 46. These elements of the second rolling die 42 are dimensions such that, when the male member 44 is positioned in the female member 46, a space 48 having the shown cross-sectional area is present between these dies. The intermediate ring 10 shown in FIG. 5 is placed in the female member 48 and the male member 44 is rolled into it to cold-roll the intermediate ring into the cross-sectional area of the space 48.

In accordance with one of the primary features of this invention, the male member 44 includes shoulder members 50 which engage the end surfaces 18 and 20 of the flanges 14 and 16 respectively of the ring 10. Thus, when the intermediate ring is cold-rolled the second time in the step 40, the ring 10 is engaged in the second rolling die 42 both on its inner and outer surfaces and on the ends of the flanges.

As was noted above in the description of FIG. 5, in the first cold rolling step 28, the flanges 14 and 16 were formed longer than were desired for the finished sealing ring. In the second cold rolling step 40, the end surfaces 18 and 20 of the elongated flanges are engaged by the shoulders 50 on the male die 44, and at least a portion of this excess length of the flanges is compressed downwardly into the flange and caused to cold flow into the curved section 12 of the sealing ring 10 to cause the thickness of the sealing ring 10 to increase, even though the rolling operation would normally cause the ring to thin, in the manner described above. Thus, the above described thinning which might have occurred in the first cold rolling step 28 is compensated out, and the desired constant thickness of the sealing ring 10 is provided. In practice, it has been found that any reasonable desired thickness of the ring can be provided by adjusting the dimensions of the shoulder 50 and the length of the flanges 14 and 16. It has even been found possible to actually increase the thickness of the sealing ring in the curved portion relative to the thickness of the original tubular ring. Thus, in accordance with the present invention, the undesirable thinning which was thought to preclude cold-rolling of such sealing rings is successfully overcome.

Figure 6:
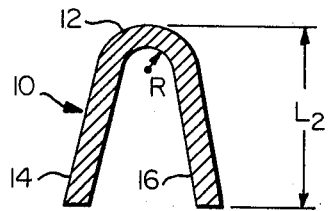
FIG. 6 is a cross-sectional view of the sealing ring after it has passed through the second die of FIG. 4.

FIG. 6 shows a cross-sectional view of the sealing ring 10 after it is removed from the second die 42 at the conclusion of the second cold rolling step 40. As is shown in FIG. 6, the cross-section of the ring 10 now is in the same general shape as is shown in FIG. 2. In the case of the typical ring 10 described above, the dimensions are: the internal radius of curvature R of the curved section 12 is now the desired 0.025 inches. The length of the flanges 14 and 16 are now such as to form the dimension $L_2$ shown in FIG. 6. If precise quality control is maintained, this dimension can be cold-rolled to the desired 0.200 inches described above. However, it is preferred that the dimension $L_2$ is still somewhat longer than this, and might typically be 0.210 inches. The reason for this is, as is subsequently described below, it is usually desirable to machine the ring 10 to provide the desired tapering thickness of the flanges 14 and 16 and the desired lands 22 and 24 anyhow, and this excess length of the flanges 14 and 16 can then conveniently and economically be machined off at the same time to precise dimensions.

Since it is usually desired to heat treat the rings 10 after they have been formed into a generally U-shaped inwardly opening cross-section, it is usually desirable that the sealing ring 10 have a smaller outside diameter than is desired after the second cold rolling step 40 in order that it may be stretched or expanded later to precise dimensions. Typically, to form the ring described above, the ring 10 of FIG. 6 might have an outside diameter of 3.76 to 3.77 inches.

Returning now to the description of FIG. 3, after the second cold rolling step 40, the next step 42 in the method is to expand the ring prior to heat treating. This ring expansion is conveniently done in an expanding mandrel of the type well known to those skilled in the art. In the case of the ring described above, the ring is first expanded until it has an outside diameter of 3.785 inches.

After the initial expansion step 42, the next step 44 is to heat treat the sealing ring 10 in any desired manner to provide the necessary or desired metallurgical properties to the ring 10. Again, the particular details of the heat treating are not given, since they will depend upon the material from which the ring 10 is formed and the properties which are desired to be imparted to the ring. The manner of heat treating such rings is well known to those skilled in the art, and the conventional heat treating methods are used in this invention.

After the heat treating step 44, which can result in some distortion or warping of the ring 10, the ring is again expanded in the next step 46 to the desired final outside dimension. Again, expansion can conveniently occur in the well known expanding mandrels. Since the ring has now been heat treated and is considerably harder than it was before, it is preferable that as much expansion as possible is done in the first ring expansion step 42 to leave less expansion for the second expansion step 46.

After the second expansion step 46, and preferably while the ring 10 is still being supported by the expanding mandrel, the final step 48 in the method is to machine the ring 10 to the desired final dimensions. At this time, the desired taper in the flanges 14 and 16 can be machined into the ring, the lands 22 and 24 can be formed and the end surfaces 18 and 20 of the flanges can be cut to the desired final length.

By the method just described, sealing rings are formed in a simple and economical manner. In addition, the sealing rings which are formed by this method are actually superior to the prior art sealing rings formed by other methods. As was noted above, since the sealing ring 10 is formed from an originally flat strip of metal, rather than being machined from a solid piece of metal, the grain structure in the ring is constant relative to the cross-section all the way around the ring. In addition, the cold flow of metal downward into the ring in the second cold rolling step 40 above moves the neutral axis of the ring outward, and thereby renders the ring less likely to fracture when it is in use. Yet another advantage is that, since the rings go through two expansion steps, the expansion steps 42 and 46 described above, the quality of the weld which formed the tubular ring in the step 26 is inherently tested, and only those rings which have a suitable high quality weld can be successfully expanded. Those rings which have weak welds will rupture during the expansion steps, and thus it is assured that only high quality rings will complete the operation. This is an especially advantageous feature, since the weld is a common place for such rings to fail.

While the invention is thus disclosed and the presently preferred embodiment described in detail, it is not intended that the invention is limited to these shown embodiments. Instead, many modifications will occur to those skilled in the art which lie within the spirit of the invention. It is thus intended that the invention be limited in scope only by the appended claims.

What is claimed is:

1. The method of manufacturing a sealing ring or the like having predetermined outside and inside diameters and a generally U-shaped inwardly opening cross-section, said cross-section having a predetermined internal radius of curvature and flanges of a predetermined flange length, said method comprising the steps of:

forming a tubular band of metal whose diameter is between said predetermined outside and inside diameters, rolling said tubular band into an intermediate ring in a first die until it has a generally U-shaped inwardly opening cross-section having an internal radius of curvature greater than said predetermined internal radius and having flanges longer than said predetermined flange length, and rolling said intermediate ring in a second die until said ring has said predetermined internal radius of curvature, said second die engaging the inner surface, the outer surface and the ends of the flanges of said ring to force metal to cold flow from said flanges down into the curved portion of the cross-section to prevent thinning of said curved portion of said ring.

2. The method of claim 1 in which said sealing ring is formed to have an outside diameter less than said predetermined outside diameter after said second rolling step and which further comprises the step of stretching said ring after said second rolling step until said ring has said predetermined outside diameter.

3. The method of claim 2 which further comprises the step of heat treating said sealing ring prior to said step of stretching said ring.

4. The method of claim 3 which further comprises the step of initially stretching said ring prior to said step of heat treating said ring.

5. The method of claim 1 which further comprises the step of machining said ring to predetermined dimensions after said second rolling step.

* * * * *